United States Patent [19]

Stepp et al.

[11] Patent Number: 5,527,935

[45] Date of Patent: Jun. 18, 1996

[54] ORGANOPOLYSILOXANES HAVING BIFUNCTIONAL TERMINAL SILOXANE UNITS

[75] Inventors: Michael Stepp; Peter John, both of Burghausen, Germany

[73] Assignee: Wacker-Chemie GmbH, Munich, Germany

[21] Appl. No.: 305,006

[22] Filed: Sep. 14, 1994

[30] Foreign Application Priority Data

Sep. 23, 1993 [DE] Germany .............. 43 32 425.8

[51] Int. Cl.⁶ ............................................. C07F 7/08
[52] U.S. Cl. ..................... 556/445; 512/450; 512/453; 512/455; 512/456
[58] Field of Search ..................... 556/450, 453, 556/455, 456, 445

[56] References Cited

U.S. PATENT DOCUMENTS

| | | |
|---|---|---|
| 4,737,563 | 4/1988 | Arai et al. . |
| 4,849,491 | 7/1989 | Ogawa et al. . |

FOREIGN PATENT DOCUMENTS

| | | |
|---|---|---|
| 0251435 | 1/1988 | European Pat. Off. . |
| 0412550 | 2/1991 | European Pat. Off. . |
| 0431173 | 6/1991 | European Pat. Off. . |
| 0516143 | 12/1992 | European Pat. Off. . |

OTHER PUBLICATIONS

"The Alcoholysis of Hydrosilanes" by E. Lukevics et al., Journal of Organomet. Chemistry, 295 (1985) 265–315, Lausanne.

*Primary Examiner*—Paul F. Shaver
*Attorney, Agent, or Firm*—Martin Connaughton

[57] ABSTRACT

The present invention relates to the organopolysiloxanes having the formula $$[R^1Si(OSiR^2{}_2X)_2OSiR^2{}_2O_{1/2}]_a[R_3SiO_{1/2}]_b[R_2SiO]_c[RSiO_{3/2}]_d[SiO_2]_e \quad (1),$$

where

R is optionally substituted $C_1$- to $C_{18}$-hydrocarbon radicals, $R^1$ is an optionally substituted $C_6$- to $C_{15}$-hydrocarbon radical having at least one phenyl ring, $R^2$ is a $C_1$- to $C_3$-hydrocarbon radical, X is a hydrogen atom or an organic or organosilicon functional group bonded via a divalent, optionally substituted $C_2$- to $C_{15}$-hydrocarbon radical, with one or more methylene units of the hydrocarbon radical being able to be replaced by oxygen atoms bonded on both sides to carbon atoms, a is an integer of at least 1 and b, c, d and e are each 0 or a positive integer, and the sum of a, b, c, d and e is at least 3, and the process for the preparation thereof.

4 Claims, No Drawings

ORGANOPOLYSILOXANES HAVING BIFUNCTIONAL TERMINAL SILOXANE UNITS

FIELD OF INVENTION

The present invention relates to organopolysiloxanes having bifunctional terminal siloxane units and a process for the preparation thereof.

A relatively high density of functional groups in the chain ends of a siloxane gives a series of desired properties, such as an improved ability to be incorporated by crosslinking or a higher polarity, which can lead to an improved surface activity.

BACKGROUND OF INVENTION

Bifunctional groups at the chain ends of a siloxane are frequently obtained by reaction of a polysiloxane under equilibrating conditions with a disiloxane which has the bifunctional group on one silicon atom. However, only those bifunctional groups which are stable under equilibrating conditions can be introduced. In these processes, polysiloxanes having only one functional chain end or having different end groups give an undesired random end-group distribution.

A bifunctional group can be bonded more selectively to the chain ends of a siloxane having terminal SiH groups by hydrosilylation of an unsaturated compound having two functional groups. However, such unsaturated compounds are unobtainable or obtainable only in an uneconomic way.

It is simpler to introduce into polysiloxanes end groups which open the possibility of multiple hydrosilylation with readily available unsaturated compounds, that is end groups having a plurality of Si—H functions which are as similarly reactive as possible, i.e., equivalent SiH-functions.

The introduction of two or three similarly reactive Si—H radicals into a monofunctional oil is described in EP-A 516 143. However, a disadvantage of this process is the multistage synthesis. First, a monofunctional polysiloxane is prepared by anionic ring-opening polymerization of hexamethylcyclotrisiloxane with lithium butoxide as initiator. The "living" silanolate end group or (after hydrolysis) silanol end group can subsequently be reacted with a chlorosiloxane which can be obtained by hydrosilylation of vinyldimethylchlorosilane with $(HSiMe_2O)_3SiMe$ or $(H—SiMe_2O)_4Si$ in the stoichiometric ratio 1:1. In the hydrosilylation, large excesses of the H-siloxane have to be used, since otherwise only small yields can be obtained. A clean separation of multiply substituted products is only possible by means of distillation. However, this process possesses further disadvantages: first, an excess of the chlorine compound has to be added to the monofunctional polysiloxane, since remaining silanol or silanolate groups or traces of LiOH could endanger the stability of the final product by decomposition of the Si—H groups. Moreover, the excess of this high-boiling corrosive substance has again to be completely distilled out of the mixture after the reaction, since HCl would be formed in the final product by hydrolysis of remaining Cl—Si units, which would have to lead to skeletal rearrangement in siloxanes containing Si—H end groups and thus to the instability of the final product. When using a mono-OH oil, the use of an auxiliary base such as triethylamine for neutralizing the HCl formed cannot be omitted. The result is an additional filtration step after the reaction is complete for removing the ammonium chloride formed, which is usually difficult to remove.

It is an object of the present invention to provide organopolysiloxanes having bifunctional terminal siloxane units via a simple, selective process which can be carried out without complicated purification steps.

The invention provides organopolysiloxanes of the formula

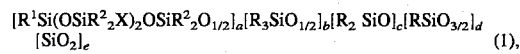

$[R^1Si(OSiR^2_2X)_2OSiR^2_2O_{1/2}]_a[R_3SiO_{1/2}]_b[R_2SiO]_c[RSiO_{3/2}]_d[SiO_2]_e$     (1), where R is optionally substituted $C_1$- to $C_{18}$-hydrocarbon radicals, $R^1$ is an optionally substituted $C_6$- to $C_{15}$-hydrocarbon radical containing at least one phenyl ring, $R^2$ is a $C_1$- to $C_3$-hydrocarbon radical, X is a hydrogen atom or an organic or organosilicon functional group bonded via a divalent, optionally substituted $C_2$- to $C_{15}$-hydrocarbon radical, with one or more methylene units of the hydrocarbon radical being able to be replaced by oxygen atoms bonded on both sides to carbon atoms, a is an integer of at least 1 and b, c, d and e are each 0 or a positive integer, and the sum of a, b, c, d and e is at least 3.

Examples of radicals R are alkyl radicals such as the methyl, ethyl, n-propyl, iso-propyl, n-butyl, iso-butyl, tert-butyl, n-pentyl, iso-pentyl, neo-pentyl, tert-pentyl radical; hexyl radicals such as the n-hexyl radical; heptyl radicals such as the n-heptyl radical; octyl radicals such as the n-octyl radical and iso-octyl radicals such as the 2,2,4-trimethylpentyl radical; nonyl radicals such a the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radicals and methylcyclohexyl radicals; aryl radicals such as the phenyl, naphthyl and anthryl and phenanthryl radical; alkaryl radicals such as the o-, m-, p-tolyl radicals, xylyl radicals and ethylphenyl radicals; and aralkyl radicals such as the benzyl radical, the α- and the β-phenylethyl radical and the 2-phenylpropyl radical.

Examples of substituted radicals R are cyanoalkyl radicals such as the β-cyanoethyl radical; halogenated hydrocarbon radicals, for example haloalkyl radicals such as the 3,3,3-trifluoro-n-propyl radical, the 2,2,2,2',2',2'-hexafluoroisopropyl radical, the heptafluoroisopropyl radical, and haloaryl radicals such as the o-, m- and p-chlorophenyl radical and alkoxyhydrocarbon radicals having from $C_1$- to $C_{10}$-alkoxy radicals, such as the methoxyethyl radical.

Preferred examples of the radical R are $C_1$ to $C_8$-alkyl radicals, in particular the methyl radical.

Examples of radical $R^1$ are the same as specified above for the radical R, of substituted or unsubstituted phenyl radicals, alkaryl radicals and aralkyl radicals. Preferred examples of radicals $R^1$ are phenyl, 2-phenylethyl, 1-phenylethyl, 1-phenylpropyl, 2-phenylpropyl, 3-phenylpropyl, 4-chlorophenyl, 2,4-dichlorophenyl, 4-fluorophenyl radicals. Preferably $R^1$ is the phenyl, the 2-phenylpropyl or the 2-phenylethyl radical, more preferably the phenyl or the 2-phenylpropyl radical.

Particular preference is given to the alkylphenyl radicals $R^1$ in which the phenyl radical is bonded to the silicon atom via a divalent $C_1$- to $C_3$-alkylene radical, and the phenyl radical.

The radicals $R^2$ are the methyl, ethyl, n-propyl and isopropyl radical, with the ethyl and, in particular, the methyl radical being preferred.

Examples of radicals X are $C_2$- to $C_{20}$-alkenyl radicals such as the radicals trans-4-hexen-1-yl, cis-4-hexen-1-yl, 5-hexen-1-yl, 3-buten-1-yl, 2-buten-1-yl, 6-methyl-6-hepten-1-yl, (bicyclo[2.2.-1]hept-1-en-4-yl)-1-ethyl, 1-cyclododeca-4,8-dienyl, (cyclohex- 1-en-4-yl)-1-ethyl, cyclopentenyl, cyclohexenyl, cyclooctenyl, cycloocta-2,4,6-trienyl, —$(CH_2)_3$—O—CH=CH—$CH_3$, —$(CH_2)_3$—O—$CH_2$—CH=$CH_2$, —CH=CH—CH($CH_3$)—O$CH_2$CH=$CH_2$, —C(=$CH_2$)—CH($CH_3$)—O$CH_2$CH=$CH_2$, —C(=CHC$H_2$O$CH_2$CH=$CH_2$)—$CH_2$O$CH_2$CH=$CH_2$ and —C(=CHCH($CH_3$)—O$CH_2$CH=$CH_2$)—CH($CH_3$)—O$CH_2$CH=$CH_2$;

$C_4$ to $C_{20}$-epoxy radicals such as the radicals —$(CH_2)_3$—O—$CH_2$—CHO$CH_2$, —$(CH_2)_3$(O$CH_2$$CH_2$)$_4$—O—$CH_2$—CHO$CH_2$, —$(CH_2CH_2)$—(cyclohexene oxide) and —$CH_2$CH($CH_2$O$CH_2$CHO$CH_2$)$_2$;

$C_5$- to $C_{20}$-(meth)acrylate radicals such as the radicals —$(CH_2)_3$—OOCCH=$CH_2$, —$(CH_2)_3$—OOCC($CH_3$)=$CH_2$, —$(CH_2)_3$—(O$CH_2$$CH_2$)$_4$—OOCC($CH_3$)=$CH_2$, —$(CH_2)_3$—NHOCCH=$CH_2$, —$(CH_2)_3$—ONHCC($CH_3$)=$CH_2$, —$(CH_2)_{11}$—OOCCH=$CH_2$, —$(CH_2)_{11}$—OOCC($CH_3$)=$CH_2$, —$(CH_2)_3$—O—$CH_2$—CH[OOCC($CH_3$)=$CH_2$]—$CH_2$—OOCC($CH_3$)=$CH_2$, —C(=$CH_2$)—$CH_2$O$CH_2$$CH_2$OOCCH=$CH_2$ and —CH=CH—$CH_2$O$CH_2$ $CH_2$OOCCH=$CH_2$;

silylated or unsilylated aminoalkyl radicals such as the radicals —$(CH_2)_3$—NH—$(CH_2)_2$—$NH_2$, —$(CH_2)_3$(O$CH_2$$CH_2$)$_4$—$NMe_2$, —$(CH_2)_3$—$NH_2$, —$(CH_2)_3$—NH—$SiMe_3$, —$(CH_2)_3$—N($SiMe_3$)$_2$, —$(CH_2)_3$—N(imidazole), —$(CH_2)_3$—N(morpholine) and —$(CH_2)_3$—NH(cyclohexyl);

imido- or amidoalkyl radicals such as the radicals —$(CH_2)_3$—N(phthalimido), —$CH_2$CH—[$CH_2$—(N-phthalimido)]$_2$—;

$C_3$- to $C_{20}$-hydroxy(ar)alkyl radicals having or not having a silyl or acetonide end group, such as the radicals —$(CH_2)_3$—O$SiMe_3$, —$(CH_2)_3$—O—$CH_2$—CH[O$SiMe_3$)]—$CH_2$—O$SiMe_3$, —$(CH_2)_3$—OH, —$(CH_2)_3$—O—$CH_2$—CH(OH)—$CH_2$—OH (or the corresponding acetonide), —$(CH_2)_{11}$—OH, —$(CH_2)_4$—OH, —$(CH_2)_3$—p—$C_6H_4$O$SiMe_3$, —$(CH_2)_3$—O—p—$C_6H_4$O$SiMe_3$, —$(CH_2)_3$—O—sym—$C_6H_3$ (O$SiMe_3$)$_2$, —$(CH_2)_{11}$—O—$SiMe_3$, —CH=CHC$H_2$O$CH_2$$CH_2$OH, —C(=$CH_2$)—$CH_2$O$CH_2$$CH_2$OH, —C(=CH—$CH_2$O$CH_2$$CH_2$OH)—$CH_2$O$CH_2$$CH_2$OH, —CH=CH—C(OH)($CH_3$)$_2$ and —C(=$CH_2$)C(OH)($CH_3$)$_2$;

$C_3$- to $C_{20}$-carboxy(ar)alkyl radicals such as the radicals 2-allyl succinic anhydride adduct (=—$CH_2$—$CH_2$—$CH_2$—CH—$CH_2$—CO—O—CO—), —$(CH_2)_{10}$—COO-$SiMe_3$, —$(CH_2)_{10}$—COOH, —$CH_2$—$CH_2$—COOMe, —$CH_2$—$CH_2$—COO$SiMe_3$, —$CH_2$—CH($CH_3$)COOMe, —$CH_2$—$CH_2$—COO—($CH_2$—$CH_2$—O)$_4$Me, —$(CH_2)_{10}$—COO—CH=$CH_2$ and —$(CH_2)_3$—OOC$CH_3$;

$C_3$- to $C_{40}$-silylalkyl radicals such as the radicals —$(CH_2)_2$—$SiMe_2$Cl, —$(CH_2)_3$$SiMe_2$Cl, —$(CH_2)_2$—$SiCl_3$, —$(CH_2)_2$—$SiMeCl_2$, —$(CH_2)_2$—Si(OMe)$_3$, —CH($CH_3$)—Si(OMe)$_3$; —$(CH_2)_3$—Si(OMe)$_3$, —$CH_2$—CH($CH_3$)—Si(OMe)$_3$; —$(CH_2)_2$—Si(OEt)$_3$, —$(CH_2)_3$—Si(OEt)$_3$, —$(CH_2)_6$—Si(OMe)$_3$, —$(CH_2)_6$—Si(OEt)$_3$, —$(CH_2)_2$—(Si$Me_2$O)$_{15}$—Si$Me_3$, —$(CH_2)_3$—(O$CH_2$$CH_2$)$_4$—$(CH_2)_3$—Si(OEt)$_3$; —$(CH_2)_2$—Si(OMe)$_2$Me, —$(CH_2)_3$—Si(OMe)$_2$Me, —$(CH_2)_2$—Si(OEt)$_2$Me, —$(CH_2)_3$—Si(OEt)$_2$Me, —$(CH_2)_6$—Si(OMe)$_2$Me, —$(CH_2)_6$—Si(OEt)$_2$Me and —$(CH_2)_2$—(OSi$Me_2$)$_4$—OSi(OEt)$_2$—H and $C_3$- to $C_{20}$-haloalkyl radicals such as the radicals —$(CH_2)_3$—Cl, —$(CH_2)_6$—Cl, —$(CH_2)_2$—$CF_3$, —$(CH_2)_2$—$C_6F_{13}$.

Examples of substituents on the divalent $C_2$- to $C_{15}$-hydrocarbon radical are cyano groups, halogen atoms such as fluorine, chlorine and bromine and $C_1$- to $C_{10}$-alkoxy radicals such as the methoxy radical.

In the organopolysiloxane of the invention a is preferably an integer having a value greater than or equal to 0.0001 times the sum of a+b+c+d+e and less than or equal to 0.66 times the sum of a+b+c+d+e, b is preferably at most 7, in particular 0 or 1;

c is preferably from 0 to 10,000, in particular from 1 to 100, d and e are each preferably from 0 to 20, more preferably from 0 to 10 and in particular 0.

Examples of organopolysiloxanes of formula (1) in which X=H are

[Ph—Si(OSi$Me_2$—H)$_2$O$_{1/2}$][Si$Me_3$O$_{1/2}$],
[Ph—Si(OSi$Me_2$—H)$_2$O$_{1/2}$]$_2$[Si$Me_2$O]$_{35}$,
[Ph—Si(OSi$Me_2$—H)$_2$O$_{1/2}$]$_2$[Si$Me_2$O]$_{221}$,
[Ph—Si(OSi$Me_2$—H)$_2$O$_{1/2}$]$_3$[Si$Me_2$O]$_{64}$[SiMeO$_{3/2}$],
[Ph—Si(OSi$Me_2$—H)$_2$O$_{1/2}$]$_{1.5}$[Si$Me_2$O]$_{54}$[SiMeO$_{3/2}$]$_2$ [Me$_3$ SiO$_{1/2}$]$_2$,
[Ph—Si(OSi$Me_2$—H)$_2$O$_{1/2}$]$_4$[Si$Me_2$O]$_{56}$[SiO$_{4/2}$],
[Ph—Si(OSi$Me_2$—H)$_2$O$_{1/2}$]$_6$[Si$Me_2$O]$_{87}$[SiO$_{4/2}$]$_2$,
[Ph—Si(OSi$Me_2$—H)$_2$O$_{1/2}$][Si$Me_2$O]$_{17}$[Me$_3$SiO$_{1/2}$],
[Ph—Si(OSi$Me_2$—H)$_2$O$_{1/2}$][Si$Me_2$O]$_{27}$ [CF$_3$C$_2$H$_4$Me$_2$SiO$_{1/2}$],
[Ph—Si(OSi$Me_2$—H)$_2$O$_{1/2}$][Si$Me_2$O]$_{105}$[Me$_3$SiO$_{1/2}$],
[Ph—Si(OSi$Me_2$—H)$_2$O$_{1/2}$]$_2$[SiMe(CH$_2$—CH$_2$—CF$_3$)O]$_{19}$,
[Ph—Si(OSi$Me_2$—H)$_2$O$_{1/2}$]$_2$[Si$Me_2$O]$_{55}$[SiMePhO]$_{18}$,
[Ph—Si(OSi$Me_2$—H)$_2$O$_{1/2}$]$_2$[Si$Me_2$O]$_{144}$[SiPh$_2$O]$_{28}$,
[H$_3$C—CH(Ph)—CH$_2$—Si(OSi$Me_2$—H)$_2$O$_{1/2}$]$_2$[Si$Me_2$O]$_{35}$,
[H$_3$C—CH(Ph)—CH$_2$—Si(OSi$Me_2$—H)$_2$O$_{1/2}$]$_2$[Si$Me_2$O]$_{65}$,
[H$_3$C—CH(Ph)—CH$_2$—Si(OSi$Me_2$—H)$_2$O$_{1/2}$]$_2$[Si$Me_2$O]$_{105}$,
[H$_3$C—CH(Ph)—CH$_2$—Si(OSi$Me_2$—H)$_2$O$_{1/2}$]$_2$[Si$Me_2$O]$_{222}$,
[H$_3$C—CH(Ph)—CH$_2$—Si(OSi$Me_2$—H)$_2$O$_{1/2}$][Si$Me_2$O]$_{15}$ [Me$_3$ SiO$_{1/2}$],
[H$_3$C—CH(Ph)—CH$_2$—Si(OSi$Me_2$—H)$_2$O$_{1/2}$]$_3$ [Si$Me_2$O]$_{64}$ [SiPhO$_{3/2}$],

Preferred examples of organopolysiloxanes of formula (1) are

[H$_3$C—CH(Ph)—CH$_2$—Si(OSi$Me_2$—X)$_2$O$_{1/2}$]$_2$ [Si$Me_2$O]$_{35}$ having —X=

—H,

—CH$_2$—CH$_2$—Si(OMe)$_3$,

—(CH$_2$)$_3$O(CH$_2$—CH$_2$O)$_5$Me,

—(CH$_2$)$_3$OCH$_2$—CHOCH$_2$,

55% —CH$_2$—CH$_2$—Si(OMe)$_3$, 45% —H,

—(CH$_2$)$_3$—(succinic anhydride),

—(CH$_2$)$_{10}$COOSi$Me_3$ or

—O—C(OSi$Me_3$)=CH(CH$_3$),

[Ph—Si(OSi$Me_2$—X)$_2$O$_{1/2}$][Si$Me_2$O]$_{17}$[Me$_3$SiO$_{1/2}$]

having —X=

—H,

—CH$_2$—CH$_2$—CH$_2$—O—CH$_2$—CH(O)CH$_2$,

—(CH$_2$)$_2$Si(OEt)$_3$,

—O—C(OMe)=CH(CH$_3$),

—O—C(OSi$Me_3$)=CH(CH$_3$),

—CH$_2$—CH$_2$—(Si$Me_2$O)$_4$—Si(OEt)$_2$H,

—CH$_2$—CH$_2$—COOEt,

—CH$_2$—CH$_2$—COOSiMe$_3$,

—CH$_2$—CH$_2$—SiMe$_2$—NH—SiMe$_2$CH=CH$_2$,

—(CH$_2$)$_3$—(N-phthalimido),

—CH$_2$—CH$_2$—SiMe$_2$—O—SiMe$_2$CH=CH$_2$,

—CH$_2$—CH$_2$—SiMe$_2$CH=CH$_2$ or

—CH$_2$—CH$_2$—CH$_2$—CH$_2$—CH=CH$_2$,

[Ph—Si(OSiMe$_2$—X)$_2$O$_{1/2}$]$_{2.8}$[SiMe$_2$O]$_{48}$[MeSiO$_{3/2}$]

having —X=

—H,

—CH$_2$—CH$_2$—O—CH$_2$—CH(O)CH$_2$,

—(CH$_2$—CH$_2$)Si(OMe)$_3$,

—(cyclohex-4-enyl)ethyl

—(CH$_2$—CH$_2$)SiMe$_2$CH=CH$_2$,

—(CH$_2$)$_3$O(CH$_2$—CH$_2$O)$_{3.4}$Me,

—(CH$_2$)$_{10}$COOSiMe$_3$,

—(CH$_2$)$_2$SiMe$_2$Cl or

—(CH$_2$—CH$_2$)SiMe$_2$NHSiMe$_2$CH=CH$_2$

[Ph—Si(OSiMe$_2$—X)$_2$O$_{1/2}$]$_2$[SiMe$_2$O]$_{76}$[MeSi{(CH$_2$)$_3$—O(CH$_2$—CH$_2$O)$_{3.4}$—Me}O]$_{11}$ having —X=

—H

—CH$_2$—CH$_2$—SiMe$_2$—CH=CH$_2$,

—(CH$_2$)$_3$—OOC—C(CH$_3$)=CH$_2$,

—(CH$_2$)$_3$—OH,

—(CH$_2$)$_3$—O—CH$_2$—CH$_2$—OH,

—(CH$_2$)$_3$—O—CH$_2$—CH$_2$—OSiMe$_3$ or

—(CH$_2$)$_3$O(CH$_2$—CH$_2$O)$_{3.4}$Me,

[H$_3$C—CH(Ph)—CH$_2$—Si(OSiMe$_2$—X)$_2$O$_{1/2}$]$_2$[SiMe(CH$_2$—CH$_2$—CF$_3$)O]$_{19}$ having —X=

—H, or

—CH$_2$—CH$_2$—Si(OMe)$_3$,

[Ph—(CH$_2$)$_2$—Si(OSiMe$_2$—X)$_2$O$_{1/2}$]$_{3.9}$[SiMe$_2$O]$_{219}$ [SiMePhO]$_{28}$[SiO$_{4/2}$]

having —X=

—H,

—CH$_2$—CH$_2$—Si(OMe)$_3$ or

—CH$_2$—CH$_2$—Si(OOCCH$_3$)$_3$.

In the above formulae Me is a methyl group, Et is an ethyl group and Ph is a phenyl group. The decimal numbers are average values.

The organopolysiloxanes of the invention of formula (1) in which X is a hydrogen atom can be prepared by reacting an organopolysiloxane of the formula

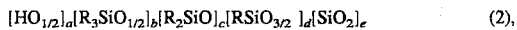

[HO$_{1/2}$]$_a$[R$_3$SiO$_{1/2}$]$_b$[R$_2$SiO]$_c$[RSiO$_{3/2}$]$_d$[SiO$_2$]$_e$ (2), with at least one molar equivalent of a siloxane of the formula

(HSiR$^2{}_2$O)$_3$SiR$^1$ (3), per mole of hydroxyl groups in the presence of catalytic amounts of hydrosilylation catalyst with liberation of hydrogen, where R, R$^1$, R$^2$, a, b, c, d and e are as specified above.

The reaction of hydroxyl compounds A—OH with Si—H functions in the presence of catalysts of subgroup 8 with elimination of hydrogen and linkage to form an Si—O—A unit is known from E. Lukevics, M. Dzintara, J. Organomet. Chem. 295 (1985), p. 265– 315. However, in siloxanes having a plurality of Si—H groups it is in principle difficult to react only one Si—H function in the desired manner and one is therefore forced to use a large stoichiometric excess of this component. With the siloxanes of formula (3), the reaction with the Si—OH end group of polysiloxanes proceeds with the desired selectivity even without a significant excess of this siloxane. The siloxanes of formula (3) are obtainable in high yields and high purity.

Merely to ensure complete reaction, it can be advantageous to use a stoichiometric excess of the siloxane of formula (3) in comparison with the hydroxyl groups of the organopolysiloxane of formula (2). The molar ratios of the siloxane of formula (3) to the hydroxyl groups of the organopolysiloxane of formula (2) are from 1 to 10, preferably from 1 to 3, in particular from 1.05 to 2.0.

The organopolysiloxanes of formula (2) can be prepared by known processes, for example by silane hydrolysis or by means of (poly)siloxane equilibration with silanes in the presence of equilibration catalysts, e.g., phosphonitrilic chlorides, and subsequent hydrolysis.

The α-hydroxyorganopolysiloxanes of formula (2) used for the preparation of the diorganopolysiloxanes of the invention of formula (1) having a,b=1, c>3, d,e=0 can be obtained by known processes, for example by means of ring-opening polymerization of hexaorganocyclotrisiloxanes. Depending on the quality of the monofunctionality, i.e., whether there are secondary constituents di-OH-terminated oil and oil terminated at both ends present, small proportions of doubly (X—SiR$^2{}_2$O)$_2$—SiR$^1$—O— terminated oils and polysiloxanes terminated at both ends by R$_3$Si— can in principle be present in the final products. However, this fact does not affect the content of the invention.

Examples of organopolysiloxanes or silanols of formula (2) are HO—Si(Ph)$_2$—OH, PhSi(OSiMe$_2$OH)$_3$, Me$_3$SiOH, Ph—SiMe$_2$OH, F$_3$C—CH$_2$—CH$_2$—SiMe$_2$—OH, Si(OSiMe$_2$OH)$_4$, F$_3$C—CH$_2$—CH$_2$ —(SiMe$_2$O)$_4$—H, HO—SiMe$_2$—CH$_2$—CH$_2$—SiMe$_2$—OH, H—(OSiMe$_2$ )$_2$—OH, H—(OSiMe$_2$)$_{13}$—OH, H—(OSiMe$_2$)$_{35}$—OH, H—(OSiMe$_2$)$_{105}$—OH, H—(OSiMe$_2$)$_{220}$—OH, H—(OSiMe$_2$)$_{640}$—OH, H—(OSiMe$_2$)$_{960}$—OH, H—(OSiMe(CH$_2$—CH$_2$ —CF$_3$))$_4$—OH, H—(OSiMe(CH$_2$—CH$_2$—CF$_3$))$_{56}$—OH, H—(OSiMe(CH$_2$—CH$_2$—CF$_3$))$_{19}$—OH, Me$_3$Si—(OSiMe$_2$)$_3$—OH, Me$_3$Si—(OSiMe$_2$)$_{15}$—OH, Me$_3$Si—(OSiMe$_2$)$_{44}$—OH, nBuMe$_2$Si—(OSiMe$_2$)$_{101}$—OH, Me$_3$Si—(OSiMe$_2$)$_{320}$—OH, Me$_3$Si—(OSiMe$_2$)$_{546}$—OH, Me$_3$Si—(OSiMe$_2$)$_{988}$—OH, F$_3$C—CH$_2$—CH$_2$—(SiMe$_2$O)$_{14}$—H, PhMe$_2$Si—(OSiMe$_2$)$_{22}$—OH, PhMe$_2$Si—(OSiMePh)$_{12}$—OH, nBuMe$_2$Si—(OSi(Ph)$_2$)$_{32}$—OH, [HO—SiMe$_2$O$_{1/2}$]$_4$[SiMe$_2$O]$_{26}$[SiO$_{4/2}$], [HO—SiMe$_2$O$_{1/2}$]$_{3.8}$[SiMe$_2$O]$_{78}$[SiO$_{4/2}$]$_{1.5}$, [HO—SiMe$_2$O$_{1/2}$]$_{2.7}$[SiMe$_2$O]$_{44}$[MeSiO$_{3/2}$]$_{1.8}$, [HO—SiMe$_2$O$_{1/2}$]$_{2.8}$[SiMe$_2$O]$_{288}$[PhSiO$_{3/2}$].

The organopolysiloxanes of the invention of formula (1) in which X is an organic or organosilicon group bonded via a divalent, substituted or unsubstituted, C$_2$- to C$_{15}$-hydrocarbon radical can be prepared in a second step by reacting an organopolysiloxane of formula (1) in which X is a hydrogen atom, prepared in the first step, in the presence of catalytic amounts of hydrosilylation catalyst with at least one molar equivalent of a compound consisting of an organic or organosilicon group which is bonded to an aliphatically unsaturated, substituted or unsubstituted, C$_2$- to C$_{15}$-hydrocarbon radical.

The aliphatically unsaturated hydrocarbon radical consists of at least one carbon-carbon double or triple bond.

Examples of aliphatically unsaturated hydrocarbon radicals are alkenyl or alkenyl-aryl radicals such as the hexenyl radical and phenylene-ethenyl radicals, with the vinyl and the allyl radical being more preferred.

In the unsaturated hydrocarbon radicals, one or more methylene units of the hydrocarbon radical can also be replaced by oxygen atoms bonded on both sides to carbon atoms. Examples of such radicals are $H_2C=CH—CH_2O—[CH_2—CH_2O]_6—$ and $H_2C=CH—CH_2—O—C_6H_4(P)—$.

Unsaturated compounds which are reacted in the second step with the organopolysiloxane of formula (1) having X=H are either commercially available or can be prepared from commercially available products in accordance with known directions.

Examples of aliphatically unsaturated compounds are 1,3-butadiene, isoprene, 1,5-hexadiene, styrene, 1,4-divinylbenzene, 1,4-diallylbenzene, 4-allyloxyphenol (or the corresponding trimethylsilyl ether), 5-vinyl-2-norbornene, 4-vinyl-1-cyclohexene, limonene, allylamine, N-allylcyclohexylamine, allydimethylamine, allyl alcohol, 2-allyloxyethanol, allyloxytrimethylsilane, allyl chloride, allyl bromide, acrolein dimethylacetal, allyl acetate, acrolein diethylacetal, $H_2C=CH—CH_2—CH(O—CH_2—CH_2—O)$, allyl vinyl ether, diallyl ether, allyl polyglycol ether, allyl—O—$(CH_2—CH_2O)_5Me$, allyl—O—$(CH_2—CH(CH_3)O)_{12}Me$, allyl-2,3-epoxypropyl ether, 2,3-epoxypropyl methacrylate, 2-allyloxyethoxytrimethylsilane, 2-allyloxy-3-butyne, diallyl ethers of 2-butyne-1,4-diol, diallyl ethers of 3-hexyne-2,5-diol, (allylamino)trimethylsilane, $H_2C=CH—CH_2(N$-phthalimido), $H_2C=CH—[CH_2—(N$-phthalimido)$]_2$, dimethyl-divinylsilane, vinyltrimethoxysilane, vinyldimethylchlorosilane, vinyltrichlorosilane, vinyltriacetoxysilane, allytrimethoxysilane, vinyltriethoxysilane, allytriethoxysilane, $Vi(SiMe_2O)_4—Si(OEt)_2—H$ (preparation in accordance with PCT WO92/19667), 1,3-divinyl-1,1,3,3-tetramethyldisilazane, 1-vinyl-1,1,3,3,3 -pentamethyldisilazane, 1,3-divinyl-1,1,3,3-tetramethyldisiloxane, 1-vinyl-1,1,3,3,3-pentamethyldisiloxane, allylsuccinic anhydride, trimethylsilyl 10-undecenoate, methyl 10-undecenoate, 10-undecen-1-ol, (10-undecenyloxy)trimethylsilane, allyl methacrylate, 2-propynoxyethyl-acrylate, bismethacrylate of 2-butyne-1, 4-diol, 2-butynediol bis(ethoxylate), 2-propynoxyethanol, 3-butyn-1-ol, 2-propyn-1-ol, 1,1-dimethyl-3-butyn-1-ol, 2,2-dimethyl-3-butyn-1-ol, 2-methyl-3-butyn-1-ol, 1-methyl-3-butyn- 1-ol, trimethylsilyl acrylate.

The organopolysiloxanes of the invention of formula (1) in which X is a hydrogen atom can be isolated or subsequent to their preparation can, in a second step without removal of the hydrosilylation catalyst, be reacted with the aliphatically unsaturated compounds to give organopolysiloxanes of formula (1) in which X is not H, that is X is an organic or organosilicon group bonded via a divalent, substituted or unsubstituted, $C_2$- to $C_{15}$-hydrocarbon radical.

Use of defined amounts of unsaturated compounds allows the desired degree of reaction to be achieved, which also means that varying degrees of completeness of reaction can be obtained if desired when subsequent reactions such as the incorporation by crosslinking via remaining Si—H functions is to follow. After the hydrosilylation reaction of the second step, the proportion of end groups having X=H is usually 0–90 mol %, preferably 0–50 mol %, in particular 0 mol %. The amount of the catalyst used in the first step can advantageously be calculated so that it still accelerates the second step in a desired manner.

For the preparation of the organopolysiloxanes of the invention in which X=H, and also for the reaction thereof with aliphatically unsaturated compounds in the second step, use can be made of all catalysts which have been used for the reaction of Si—H functions with alkenes and/or alkynes. Suitable catalysts are platinum metals and/or their compounds, preferably platinum and/or its compounds. Examples of such catalysts are metallic and finely divided platinum, which can be present on supports such as silicon dioxide, aluminum oxide or activated carbon, platinum colloids, compounds or complexes of platinum such as platinum halides such as $PtCl_4$, $H_2ptCl_6.6H_2O$, $Na_2ptCl_4.4H_2O$, platinum olefin complexes, platinum alcohol complexes, platinum alkoxide complexes, platinum ether complexes, platinum aldehyde complexes, platinum ketone complexes including reaction products of $H_2PtCl_6.6H_2O$ and cyclohexanone, platinum vinylsiloxane complexes, in particular platinum divinyltetramethyldisiloxane complexes containing or not containing detectable inorganically bonded halogen, bis(gamma-picoline)platinum dichloride, trimethylenedipyridine platinum dichloride and also (dimethyl sulphoxide)(ethylene)platinum(II) dichloride or rhodium metal, colloidally dispersed or applied to support materials, or rhodium compounds such as $RhClCO(PPh_3)_2$, $RhCl_3.4H_2O$, $[Rh(CO)_2Cl]_2$, $Rh(CO)_2(acac)$, $RhCl(PPh_3)_3$.

The catalyst concentration required for complete reaction depends on the activity of the respective catalyst system and also on the type of reaction in steps one and two and also on the respective reactants and has to be determined for the individual case. However, it preferably does not exceed 5% by weight based on the reaction mixture, for example for heterogeneous catalysts fixed on supports, and in the case of very active systems such as the platinum sym-divinyltetrasiloxane complex can be reduced to from 500 to 0.5 ppm by weight of catalyst metal, based on the weight of the total mixture. Usually the concentration of the catalyst in both the first reaction step and in the second reaction step is between 0.5 and 150 ppm, preferably between 1 and 100 ppm, more preferably between 5 and 70 ppm. In addition, different catalysts in different concentrations can be used for the first and the second reaction steps.

The reactions between the siloxane of formula (3) and the hydroxyl-functional polysiloxane of formula (2) or the second reaction step of the organopolysiloxane of formula (1) having X=H can be carried out by mixing of the participating components with the respective catalyst in a stirred reactor. Since gaseous hydrogen is formed in the preparation of organopolysiloxanes of formula (1) having X=H, it is advisable, particularly when working with relatively large amounts, to blanket the reaction mixture with a protective gas such as argon or nitrogen.

To avoid undesired violent reactions it can be advantageous to initially charge one component and to meter in the other component in a controlled manner, with the catalyst required being able to be introduced into the reaction mixture either by metering separately or in admixture with the initially charged and/or metered-in component. In the preparation of the polysiloxane of formula (1) having X=H, a mixture of siloxane of formula (3) and catalyst is preferably initially charged and the OH-functional organopolysiloxane of formula (2) is metered in. In the preparation of organopolysiloxanes of formula (1) in which X is not H, organopolysiloxane of formula (1) in which X=H is preferably initially charged in admixture with the catalyst and the other reactant is metered in. Particular preference is given to the preparation of the organopolysiloxanes of the invention of formula (1) in which X is not H directly subsequent to the preparation of the organopolysiloxane of formula (1) in which X=H in the same reaction vessel, with the catalyst required for the second step (Si—H addition) already being present to a sufficient degree, in type and amount, from the first step and the other reactant being metered in. In the case of bifunctional reactants, such as dimethyldivinylsilane or allyl methacrylate, it is advantageous to initially charge a stoichiometric excess of the bifunctional compound and to meter in organopolysiloxane of formula (1) in which X=H including catalyst or with additional catalyst.

The reaction to give organopolysiloxanes of formula (1) can be carried out either batchwise in a stirred reactor or else continuously, in a loop reactor, under the pressure of the surrounding atmosphere or under increased pressure up to $10^5$ hPa or under reduced pressure down to $10^{-6}$ hPa and at a temperature of 0°–200° C., preferably at a pressure of from 900 to 1100 hPa and a temperature of from 20° to 180° C. Particular preference is given to the method of operating in which the preparation of the organopolysiloxane of the invention of formula (1) in which X=H is carried out at the pressure of the surrounding atmosphere and at a lower temperature, preferably 20°–100° C., more preferably 20°–70° C., than the subsequent reaction with the unsaturated compound to give the organopolysiloxane of formula (1) having X not being H, preferably at a temperature of 50°–180° C., more preferably 70°–120° C. If necessary, volatile components of the reaction mixture, for example excess of the siloxane of formula (3) or solvent in the first step or excess of the compound bearing unsaturated radicals in the second step are removed by distillation, preferably at a pressure of from $10^{-6}$ to $8 \cdot 10^2$ hPa, after the reaction is complete. The end or the degree of reaction of the first or second step can be determined by means of NMR or IR spectroscopy or by a titration.

The use of solvents is not necessary in the reaction to give the organopolysiloxane of formula (1), but may give advantages, for example for dilution if the viscosity of the reaction mixture is very high or a particular stabilization of the OH functions against condensation, is desired. All solvents or solvent mixtures which, because of their chemical structure, cannot lead to undesired secondary reactions, which do not impair the catalyst activity and which have a boiling point or boiling range of up to 120° C. at 0.1 hPa, are preferred for the process of the invention. Examples of such solvents are aliphatic hydrocarbons such as pentane, hexane, heptane, octane, cyclohexane, methylcyclohexane, hexahydronaphthalene, decalin or mixtures of various hydrocarbons such as petroleum ether or mixed alkane fractions from petroleum distillation; aromatic hydrocarbons such as benzene, toluene, m-xylene, o-xylene, p-xylene or mixtures thereof; halogenated hydrocarbons such as dichloromethane, trichloromethane, tetrachloromethane, perchloroethylene, 1,2,3-trichloropropane, chlorobenzene; ethers such as diethyl ether, methyl-t-butyl ether, THF, dimethoxyethane, diethylene glycol dimethyl ether, diethylene glycol dibutyl ether, di-n-butyl ether, 1,4-dioxane or mixtures of these solvents.

The designation solvent does not mean that all reaction components have to dissolve. The reaction can also be carried out in a suspension or emulsion of one or more reactants. The reaction can also be carried out in a solvent mixture having a miscibility gap, with at least one reactant being soluble in each of the mixed phases.

To prevent undesired secondary reactions, it can be advantageous to free the starting materials of hydroxyl-containing secondary constituents, such as water or alcohols, by means of suitable methods. This can be achieved by azeotropic drying, pretreatment with molecular sieves, montmorillonites or silica gel or other absorbers such as calcium chloride, sodium sulfate or magnesium sulfate, or reaction with silazanes, silylamides, e.g., bis(trimethylsilyl)acetamide and/or chlorosilane or 2,3-dihydro-4-H-pyran, which can be removed from the final product without problems even when a stoichiometric excess is used. The latter method can be used to reversibly block, by means of protective groups, unsaturated compounds having protic functions, such as allyl alcohol, and thus to likewise avoid secondary reactions of the protic function. After the reaction is complete, the silyl protective group can be again cleaved off, by the action of aqueous or alcoholic potassium or tetrabutylammonium fluoride solution or with methanol in the presence of acid (heterogeneous) catalysts.

If desired, after the reaction is complete, the catalysts used can be removed from the product by means of suitable, sometimes commercially available, absorbers, such as activated carbon, ion exchangers, zeolites, metal powders, bentonites.

Depending on the function X, the organopolysiloxanes of the invention of formula (1) can be used as crosslinkers for RTV addition rubber systems (X=H), RTV condensation rubber systems (X e.g. —$CH_2$—$CH_2$—$Si(OCH_3)_3$), as coating materials for making hydrophobic or hydrophilic the surfaces of materials such as concrete, wood, metal such as steel, iron, copper, woven textiles, nonwoven materials, glass, ceramic, plastics, paper, or for improving the sliding properties at interfaces, as hydraulic fluids, as emulsifiers, as comonomers in the modification of polysiloxanes or the copolymerization with other monomers for optimizing the properties of engineering plastics, as internal plasticizers and impact modifiers for plastics such as polyepoxides, polyesters, polycarbonates, polyvinyl compounds, polyamides and polyimides.

In the examples described below, all viscosities are at a temperature of 25° C. Unless otherwise indicated, the examples below are carried out at the pressure of the surrounding atmosphere, at about 1,000 hPa, and at room temperature, about 20° C. or at a temperature which is established on combining the reactants at room temperature without additional heating or cooling. All parts and percentages are by weight, unless otherwise indicated.

The following abbreviations are used:
Me: methyl radical
Et: ethyl radical
Ph: phenyl radical

EXAMPLE 1

Preparation of an Organopolysiloxane of Formula (1) Having X=H 131 g (0.05 mol; =0.1 mol of OH) of a polysiloxane of the average formula $HO(SiMe_2O)_{34.5}H$ were metered into a mixture of 41.25 g (0.125 mol) of $(HSiMe_2O)_3SiPh$ and 1.13 g of a 1% strength Pt solution, of $[Pt[(H_2C=CHSiMe_2)_2O]_2]$ in n-hexane, corresponding to 66 ppm of Pt based on the total mixture, in such a way that the internal temperature did not exceed 40° C. The mixture was allowed to react further for one hour at 70° C. and subsequently all volatile constituents were drawn off on a rotary evaporator at 120° C./1 hPa. The remaining residue was 164 g of a clear, yellow oil, which had a viscosity of 43 mm²/s at 25° C. and to which, according to $^{29}$Si-NMR and $^1$H-NMR analysis, the following formula could be assigned:

EXAMPLE 2

(a) Preparation of $(HSiMe_2O)_3SiCH_2CHPhCH_3$

2-Phenylpropyltrichlorosilane (0.43 mol) was added dropwise at 25° C. to a mixture of 116 g (0.87 mol) of 1,1,3,3-tetramethyldisiloxane and 26 g (1.43 mol) of water. After neutralization with NaHCO$_3$ solution and drying of the product phase with molecular sieve 4A from Merck, Darmstadt, distillation gave 99 g of the target product (62% of theory) having a boiling point of 90° C./1 hPa. Characterization was carried out by means of $^1$H- and $^{29}$Si-NMR spectra.

(b) Preparation of an Organopolysiloxane of Formula (1) Having X=H 131 g (0.05 mol; =0.1 mol of OH) of a polysiloxane of the average formula HO(SiMe$_2$O)$_{34.5}$H were metered into a mixture of 43 g (0.115 mol) of (HSiMe$_2$O)$_3$SiCH$_2$CHPhCH$_3$ and 1 g of a 1% strength Pt solution, of [Pt[(H$_2$C=CHSiMe$_2$)$_2$O]$_2$] in n-hexane, corresponding to 57.5 ppm of Pt based on the total mixture, in such a way that the internal temperature did not exceed 30° C. The mixture was allowed to react further for one hour at 70° C. and subsequently all volatile constituents were drawn off on a rotary evaporator at 120° C./1 hPa. The remaining residue was 167 g of a clear, yellow oil, which had a viscosity of 61 mm$^2$/s at 25° C. and to which, according to $^{29}$Si-NMR and $^1$H-NMR analysis, the following formula could be assigned:

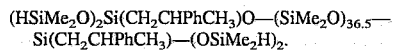

(HSiMe$_2$O)$_2$Si(CH$_2$CHPhCH$_3$)O—(SiMe$_2$O)$_{36.5}$—Si(CH$_2$CHPhCH$_3$)—(OSiMe$_2$H)$_2$.

EXAMPLE 3

Preparation of an Organopolysiloxane of Formula (1) Having X=H 94 g (0.078 mol) of a polysiloxane of the average formula Me$_3$SiO(SiMe$_2$O)$_{15}$H were metered into a mixture of 29.5 g (0.09 mol) of (HSiMe$_2$O)$_3$SiPh and 1.2 g of a 1% strength Pt solution, of [Pt[(H$_2$C=CHSiMe$_2$)$_2$O]$_2$] in n-hexane, corresponding to 96 ppm of Pt based on the total mixture, in such a way that the internal temperature did not exceed 30° C. The mixture was allowed to react further for one hour at 30° C., all volatile constituents were subsequently drawn off on a rotary evaporator at 100° C./1 hPa and the liquid was filtered through 2 g of bentonite as filter aid. The remaining residue was 100 g of a clear, yellow oil, which had a viscosity of 17 mm$^2$/s at 25° C. and to which, according to analysis by $^{29}$Si-NMR, $^1$H-NMR and SFC (supercritical fluid chromatography), the following formula could be assigned:

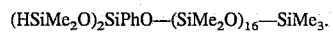

(HSiMe$_2$O)$_2$SiPhO—(SiMe$_2$O)$_{16}$—SiMe$_3$.

COMPARATIVE EXAMPLE 4

Use of a Siloxane Which Does Not Correspond to Formula (3) (Me Instead of R$^1$)

230 g (0.19 mol) of a polysiloxane of the average formula Me$_3$SiO(SiMe$_2$O)$_{15}$H were metered into a mixture of 97 g (0.36 mol) of (HSiMe$_2$O)$_3$SiMe and 3.2 g of a 1% strength Pt solution, of [Pt[(H$_2$C=CHSiMe$_2$)$_2$O]$_2$] in n-hexane, corresponding to 65 ppm of Pt based on the total mixture, in such a way that the internal temperature did not exceed 30° C. The mixture was allowed to react further for one hour at 30° C. and subsequently all volatile constituents were drawn off on a rotary evaporator at 100° C./1 hPa. The remaining residue was 257 g of a clear, yellow oil, which had a viscosity of 15 mm$^2$/s at 25° C. and to which, according to $^{29}$Si-NMR, and $^1$H-NMR analysis, the following formula could be assigned:

[HSiMe$_2$O$_{1/2}$]$_{1.9}$[SiMeO$_{3/2}$]$_{1.1}$[SiMe$_2$O]$_{15.4}$[Me$_3$SiO$_{1/2}$]$_{0.9}$.

In this product, 23% of all [SiMeO$_{3/2}$] units are incorporated in the chain and are not located at the chain end as desired.

EXAMPLE 5

Preparation of an Organopolysiloxane of Formula (1) Having X=H 9 g (0.1 mol) of trimethylsilanol, which had previously been distilled and stored over molecular sieve 4A, were added dropwise over a period of approximately 30 minutes to a mixture of 33 g (0.1 mol) of (H—SiMe$_2$O)$_3$SiPh and 0.2 g of a 1% strength Pt solution, of [Pt[H$_2$C=CHSiMe$_2$)$_2$O]$_2$] in n-hexane, corresponding to 48 ppm of Pt based on the total mixture, in such a way that a reaction temperature of 60° C. could be maintained. The mixture was subsequently evaporated on a rotary evaporator at 40° C./1 hPa. The remaining residue was 38 g of a clear liquid to which, according to $^{29}$Si-NMR and $^1$H-NMR analysis, the following formula was assigned:

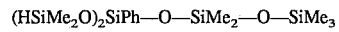

(HSiMe$_2$O)$_2$SiPh—O—SiMe$_2$—O—SiMe$_3$

EXAMPLE 6

Preparation of an Organopolysiloxane of Formula (1) Having X=H 50 g (0.014 mol; =0.055 mol of OH) of a polysiloxane of the average formula (according to $^1$H- and $^{29}$Si-NMR spectra) [HOSiMe$_2$O$_{1/2}$]$_4$[SiMe$_2$O]$_{43.4}$[SiO$_{4/2}$]$_{1.52}$ were metered into a mixture of 18.3 g (0.055 mol) of (HSiMe$_2$O)$_3$SiPh and 0.34 g of a 1% strength Pt solution, of [Pt[(H$_2$C=CHSiMe$_2$)$_2$O]$_2$] in n-hexane, corresponding to 50 ppm of Pt based on the total mixture, in such a way that the internal temperature did not exceed 30° C. The mixture was allowed to react for three hours at 50° C. and subsequently all volatile constituents were drawn off on a rotary evaporator at 100° C./1 hPa. The remaining residue was 61 g of a clear, yellow oil which had a viscosity of 49 mm$^2$/s at 25° C. and to which, according to $^{29}$Si-NMR and $^1$H-NMR analysis, the following formula could be assigned:

[(HSiMe$_2$O)$_2$SiPhO$_{1/2}$]$_4$[SiMe$_2$O]$_{51.4}$[SiO$_{4/2}$]$_{1.52}$.

EXAMPLE 7

Reaction of an Organopolysiloxane of Formula (1) Having X=H with Allyl Glycidyl Ether 27.8 g (0.018 tool) of the product from Example 3 were admixed at 70° C. with 6.8 g (0.06 mol) of allyl-2,3-epoxypropyl ether; as a result the temperature rose to 120° C. The mixture was allowed to react further for 30 minutes at 100° C. and subsequently all volatile constituents were distilled off in an oil pump vacuum. The remaining residue was 32 g of a brown, clear oil which, according to $^1$H-NMR and $^{29}$Si-NMR spectra, had the following formula:

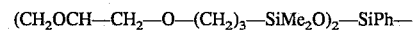

(CH$_2$OCH—CH$_2$—O—(CH$_2$)$_3$—SiMe$_2$O)$_2$—SiPh—

(OSiMe$_2$)$_{16}$OSiMe$_3$.

EXAMPLE 8

Reaction of an Organopolysiloxane of Formula (1) Having X=H with Vinyltrimethoxysilane 16 g (0.005 mol) of the product from Example 1 were admixed at 80° C. with 3 g (0.02 mol) of vinyltrimethoxysilane. As a result, the temperature of the mixture rose to 160° C. The mixture was allowed to react further for 2 hours at 100° C. The remaining residue was 16 g of a brown, clear oil which, according to $^1$H-NMR and $^{29}$Si-NMR spectra, had the following formula:

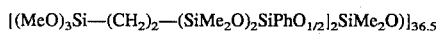
[(MeO)$_3$Si—(CH$_2$)$_2$—(SiMe$_2$O)$_2$SiPhO$_{1/2}$]$_2$SiMe$_2$O]$_{36.5}$

EXAMPLE 9

Reaction of an Organopolysiloxane of Formula (1) Having X=H with Allylsuccinic Anhydride 16 g (0.005 mol) of the product from Example 1 were admixed at 80° C. with 2.8 g (0.02 mol) of allylsuccinic anhydride. The mixture was heated to 110° C. and allowed to react further for 2 hours at 110° C. The remaining residue was 15 g of a brown, clear oil which, according to $^1$H-NMR and $^{29}$Si-NMR spectra, had the following formula:

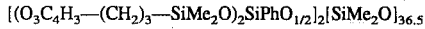
[(O$_3$C$_4$H$_3$—(CH$_2$)$_3$—SiMe$_2$O)$_2$SiPhO$_{1/2}$]$_2$[SiMe$_2$O]$_{36.5}$

EXAMPLE 10

Reaction of an Organopolysiloxane of Formula (1) Having X=H with 4-vinyl-1-cyclohexene 8.1 g (0.075 mol) of 4-vinyl-1-cyclohexene (Merck) were admixed at 70° C. with 30 g (0.0094 mol) of the product from Example 2 over a period of 15 minutes. The mixture was heated for 2 hours at 120° C. and subsequently all volatile constituents were drawn off at 100° C./1 hPa. The remaining residue was 30 g of a clear oil to which, according to $^1$H-NMR and $^{29}$Si-NMR analysis, had the following formula:

(Cyclohexenylethyl—SiMe$_2$O)$_2$Si(CH$_2$CHPhCH$_3$)O$_{1/2}$]$_2$— (SiMe$_2$O)$_{36.5}$

EXAMPLE 11

Reaction of an Organopolysiloxane of Formula (1) Having X=H with Trimethylsilyl Acrylate 8.64 g (0.06 mol) of trimethylsilyl acrylate were admixed at 70° C. over a period of 30 minutes with 32.2 g (0.01 mol) of the product from Example 1. The mixture was allowed to react further for one hour at 100° C. and volatile constituents were drawn off in vacuo (100° C./1 hPa). The remaining residue was 34 g of a clear oil which, according to $^1$H-NMR and $^{29}$Si-NMR spectra, had the following formula:

[(H$_3$CHC=C{OSiMe$_3$}O—SiMe$_2$O)$_2$SiPhO$_{1/2}$]$_2$[SiMe$_2$O]$_{36.5}$

What is claimed is:

1. Organopolysiloxanes of the formula

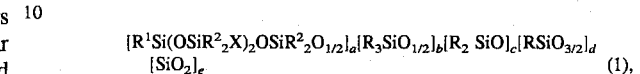
[R$^1$Si(OSiR$^2_2$X)$_2$OSiR$^2_2$O$_{1/2}$]$_a$[R$_3$SiO$_{1/2}$]$_b$[R$_2$SiO]$_c$[RSiO$_{3/2}$]$_d$ [SiO$_2$]$_e$    (1), where R is substituted or unsubstituted C$_1$- to C$_{15}$-hydrocarbon radicals, R$^1$ is a substituted or unsubstituted C$_6$- to C$_{15}$-hydrocarbon radical having at least one phenyl ring, R$^2$ is a C$_1$- to C$_3$-hydrocarbon radical, X is a hydrogen atom or an organic or organosilicon functional group bonded via a divalent substituted or unsubstituted C$_2$- to C$_{15}$-hydrocarbon radical, a is an integer of at least 1 and b, c, d and e are each 0 or a positive integer, and the sum of a, b, c, d and e is at least 3.

2. A process for preparing the organopolysiloxanes of claim 1, wherein X is a hydrogen atom, which comprises reacting an organopolysiloxane of the formula

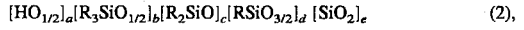
[HO$_{1/2}$]$_a$[R$_3$SiO$_{1/2}$]$_b$[R$_2$SiO]$_c$[RSiO$_{3/2}$]$_d$ [SiO$_2$]$_e$    (2), with at least one molar equivalent of a siloxane of the formula

(HSiR$^2_2$O)$_3$SiR$^1$    (3), per mole of hydroxyl groups in the presence of catalytic amounts of hydrosilylation catalyst with liberation of hydrogen, where R, R$^1$, R$^2$, a, b, c, d and e are as specified above.

3. A process for preparing the organopolysiloxanes of claim 1, which comprises reacting an organopolysiloxane of formula 1 in which X is a hydrogen atom in the presence of catalytic amounts of hydrosilylation catalyst with a compound comprising an organic or organosilicon group which is bonded to an aliphatically unsaturated, optionally substituted, C$_2$- to C$_{15}$-hydrocarbon radical.

4. The organopolysiloxanes as claimed in claim 1, wherein X is an organic or organosilicon functional group bonded via a divalent substituted or unsubstituted C$_2$- to C$_{15}$-hydrocarbon radical with one or more methylene units replaced with an oxygen atom to form a C—O—C bond.

* * * * *